(12) United States Patent
Yagi

(10) Patent No.: US 9,609,717 B2
(45) Date of Patent: *Mar. 28, 2017

(54) LIGHT-EMITTING APPARATUS AND LIGHTING APPLIANCE PROVIDED WITH THE SAME

(71) Applicant: PHILIPS LIGHTING HOLDING B.V., Eindhoven (NL)

(72) Inventor: Takaaki Yagi, Tokyo (JP)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,121

(22) Filed: Feb. 17, 2016

(65) Prior Publication Data

US 2016/0249418 A1    Aug. 25, 2016

Related U.S. Application Data

(63) Continuation of application No. 13/703,717, filed as application No. PCT/IB2011/052611 on Jun. 16, 2011, now Pat. No. 9,288,866.

(30) Foreign Application Priority Data

Jun. 18, 2010    (JP) .................................. 2010-139890

(51) Int. Cl.
| | | |
|---|---|---|
| *H01J 7/44* | (2006.01) | |
| *H01J 13/46* | (2006.01) | |
| *H01J 17/34* | (2006.01) | |
| *H01J 19/78* | (2006.01) | |
| *H01J 23/16* | (2006.01) | |
| *H01J 29/96* | (2006.01) | |
| *H05B 33/08* | (2006.01) | |

(52) U.S. Cl.
CPC ....... *H05B 33/089* (2013.01); *H05B 33/0821* (2013.01); *H05B 33/0884* (2013.01); *H05B 33/0815* (2013.01); *Y02B 20/341* (2013.01)

(58) Field of Classification Search
CPC .................................................... H05B 33/089
USPC .......................................................... 315/71
See application file for complete search history.

(56) References Cited

U.S. PATENT DOCUMENTS

| | | |
|---|---|---|
| 2006/0279262 A1 | 12/2006 | Chiang |
| 2008/0290817 A1 | 11/2008 | Ku et al. |
| 2009/0242910 A1 | 10/2009 | Murofushi et al. |

FOREIGN PATENT DOCUMENTS

| | | |
|---|---|---|
| CN | 201014383 | 1/2008 |
| JP | 2007157969 | 6/2007 |
| JP | 2008053663 A | 3/2008 |
| JP | 2009260311 | 11/2009 |

(Continued)

*Primary Examiner* — Lincoln Donovan
*Assistant Examiner* — Metasebia Retebo

(57) ABSTRACT

In various embodiments, a light-emitting apparatus is disclosed. In one example, the light-emitting apparatus comprises a substrate, an LED string mounted on the substrate, in which LED string a plurality of LEDs are connected in series, a power supply path connected in series to the LED string, and a plurality of protection elements, each protection element having a first node commonly connected to the power supply path and a second node connected between a pair of the LEDs in the series, wherein the protection elements include capacitors or zener diodes, and an AC impedance of each protection element is smaller than an impedance between the pair of LEDs and a case ground.

10 Claims, 5 Drawing Sheets

(56) References Cited

FOREIGN PATENT DOCUMENTS

| | | |
|---|---|---|
| JP | 20090301952 | 12/2009 |
| JP | 201040170 | 2/2010 |
| JP | 2010080844 | 4/2010 |
| JP | 2010080844 A | 4/2010 |
| WO | 9939319 | 8/1999 |
| WO | 2009013676 | 1/2009 |

LIGHT-EMITTING APPARATUS AND LIGHTING APPLIANCE PROVIDED WITH THE SAME

CROSS-REFERENCE TO RELATED APPLICATIONS

This patent application is a Continuation of U.S. patent application Ser. No. 13/703,717, filed Jun. 26, 2013, which claims the priority benefit under 35 U.S.C. 371 of international patent application no. PCT/IB2011/052611, filed Jun. 16, 2011, which claims the priority benefit of Japanese Application No. 2010-139890, filed Jun. 18, 2010, the contents of which are herein incorporated by reference.

FIELD OF THE INVENTION

The present invention relates to a light-emitting apparatus provided with a plurality of light-emitting diodes (LEDs) connected in series and to a lighting appliance provided with the light-emitting apparatus.

BACKGROUND OF THE INVENTION

For an electrical apparatus that is connected to an alternating-current power supply line for use, it is necessary to conduct an insulation resistance test and a withstand voltage test as quality and safety verification tests complying with safety standards such as IEC60598, UL1598, JIS C8105-1 "Luminaires-Part 1: General requirements for safety". For example, the insulation resistance test and the withstand voltage test are needed to be conducted for an LED lighting apparatus connected to a commercial alternating-current power supply.

For example, Patent Documents 1 and 2 are cited as prior art documents concerning an LED lighting apparatus in which a plurality of light-emitting diodes are provided.
Patent Document 1: JP-A-2009-301952
Patent Document 2: JP-A-2010-80844

FIG. 1 is a schematic side view showing an LED lighting apparatus 100 and a light source board 10 provided therein. The LED lighting apparatus 100 includes the light source board 10 provided with a plurality of light-emitting diodes D (D1, D2, D3) connected in series, a housing 30 to which the light source board 10 is attached, a power supply unit 40 fixed inside the housing 30, and reflector plates 50 reflecting the light of the light-emitting diodes D. A direct-current voltage generated by the power supply unit 40 connected to an external alternating-current power supply is applied across the lightemitting diodes D, such that the light of the light-emitting diodes D is radiated upward in the drawing.

The light source board 10 is formed of the light-emitting diodes D mounted on a radiation substrate 20 in order to improve thermal dissipation of the light-emitting diodes D. A specific example of the radiation substrate 20 is an MCPCB (Metal Core Printed Circuit Board). The MCPCB is a printed board formed of a conductive layer 12 in which copper connections 12a-12f are formed, a thermal conductive insulating layer 11, and a metal plate 14 which are laid one on top of another in this order. For example, an anode-side electrode of the light-emitting diode D1 is soldered to the copper connection 12a, and a cathode-side electrode is soldered to the copper connection 12b. The same goes for the other light-emitting diodes D2 and D3. The housing 30 also functions as a heat sink to improve thermal dissipation of the light-emitting diodes D and the power supply unit 40.

The above-mentioned insulation resistance test, withstand voltage test, etc. are sometimes conducted on the light source board 10 alone or conducted on the LED lighting apparatus 100 as a whole in a state in which the light source board 10 is attached to the housing 30 as shown in FIG. 1. By applying a high-voltage alternating-current voltage between the copper connections of the radiation substrate 20 and the housing 30 (that is, a case ground) by a high-voltage AC power supply 200, it is possible to check electrical insulation performance of the radiation substrate 20 of the light source board 10.

FIG. 2 is a diagram showing the configuration of the light source board 10 and a method for conducting a withstand voltage test. As in FIG. 1, the light source board 10 is formed of an LED string in which a plurality of light-emitting diodes D (D1-D6) are connected in series, and the LED string is mounted on the radiation substrate 20. Between each of copper connections N (N1-N5) which is located between the adjacent light-emitting diodes and a case ground, a corresponding one of parasitic capacitances CP (CP1-CP5) exists. The case ground corresponds to the housing 30 or the metal plate 14 shown in FIG. 1, the copper connections N1-N5 correspond to the copper connections 12b-12e shown in FIG. 1, and each copper connection M1 (M2) at one of the ends of the LED string corresponds to the respective copper connection 12a (12f) shown in FIG. 1.

When a withstand voltage test is conducted, both an end M3 of a power supply line 13a connected in series to the cathode-side end of the LED string and an end M4 of a power supply line 13b connected in series to the anode-side end of the LED string are connected to a power supply line 201 connected to the positive-electrode side of the high-voltage AC power supply 200. A power supply line 202 connected to the negative-electrode side of the high-voltage AC power supply 200 is connected to the housing 30 or the metal plate 14. That is, the high-voltage AC power supply 200 and the housing 30 (or the metal plate 14) are connected to a common electrical ground.

When a high-voltage alternating-current voltage is output from the high-voltage AC power supply 200 in this connection state, although insulation is originally provided between the power supply lines 13 (13a and 13b) and the case ground at the design stage, current paths passing through the parasitic capacitances CP are generated between the power supply lines 13 (13a and 13b) and the case ground.

FIG. 3 shows the results of simulation of a voltage between the terminals (a voltage between the electrodes), the voltage generated across the ends of each light-emitting diode, when an alternating-current voltage of 1000 V/50 Hz is applied between the power supply lines 13 (13a, 13b) and the case ground in the light source board 10. As a result, a reverse voltage of up to about −8 V is observed as a voltage between the electrodes of the light-emitting diode. The highest reverse voltage was observed at the light-emitting diodes D1 and D6, which are located at the ends of the LED string.

It is considered that the observed reverse voltage of the light-emitting diode D1 at one end of the LED string is particularly high because, when the potential of the power supply line 13 (13a, 13b) is higher than that of the case ground as a result of the application of a high-voltage alternating-current voltage, a current flows through a path of the parasitic capacitance CP1, whose impedance is lower than that of the path passing through the inner light-emitting diodes of the LED string. It is similarly considered that the observed reverse voltage of the light-emitting diode D6 at the other end of the LED string is particularly high because, when the potential of the power supply line 13 (13a, 13b) is lower than the case ground as a result of the application of a high-voltage alternating-current voltage, a current flows through the light-emitting diode D6 by passing through a path of the parasitic capacitance CP5 with a low impedance.

As a protection circuit protecting the light-emitting diodes from electrical stress caused by such an excessively high reverse voltage, bypass capacitors 6 arranged as shown in FIG. 8 are considered. FIG. 8 is a configuration diagram of an LED circuit 7 disclosed in Patent Document 2 mentioned above. In the LED circuit 7, a plurality of bypass capacitors 6 whose combined capacitance is greater than the floating capacitance Cs between light-emitting diodes 5 and an earth E are each connected in parallel to a corresponding one of the plurality of light-emitting diodes 5 connected in series.

However, in order to protect the light-emitting diodes from the above-described excessively high reverse voltage by using the protection circuit of FIG. 8, the capacitance of each bypass capacitor 6 has to be increased because the impedance between the anode and the cathode of each light-emitting diode 5 has to be lowered as the number of light-emitting diodes 5 connected in series increases. This increases the size of the bypass capacitor 6 and also increases costs.

SUMMARY OF THE INVENTION

Therefore, an object of the present invention is to provide a light-emitting apparatus that can prevent an increase in the size of a protection element protecting a light-emitting diode from an excessively high reverse voltage and an increase in cost even when the number of light-emitting diodes connected in series is increased and to provide a lighting appliance provided with the light-emitting apparatus.

To achieve the above object, a light-emitting apparatus according to the invention includes:

a substrate;

an LED string mounted on the substrate, in which LED string a plurality of LEDs are connected in series;

a power supply path connected in series to the LED string; and a protection element, which is arranged between a connection between at least one set of LEDs in the LED string and the power supply path, wherein the impedance of said protection element is smaller than an impedance between the connection and an earth.

Moreover, to achieve the above object, a lighting appliance according to the invention includes the light-emitting apparatus and a housing to which the substrate is attached, and the lighting appliance lights the LEDs by the application of a voltage.

According to the present invention, it is possible to prevent an increase in the size of a protection element protecting a light-emitting diode from an excessively high reverse voltage and an increase in cost.

EXPLANATIONS OF LETTERS OR NUMERALS

Figure 1:
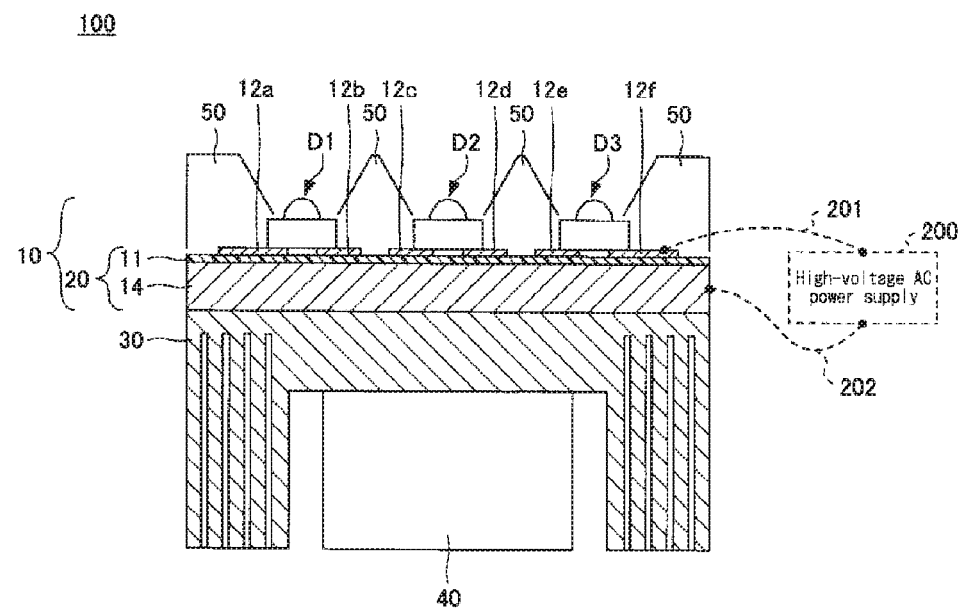
FIG. 1 is a schematic side view showing an LED lighting apparatus 100 and a light source board 10 provided therein.

C protection capacitor
CP parasitic capacitance
D light-emitting diode (LED)
N copper connection
10 light source board
11 thermal conductive insulating layer
12a-12f copper connection
13 (13a, 13b) power supply line
14 metal plate
20 radiation substrate
30 housing
40 power supply unit
50 reflector plate
60, 70 light source board
100 LED lighting apparatus
200 high-voltage AC power supply
201, 202 power supply line

DETAILED DESCRIPTION OF EMBODIMENTS

Figure 4:
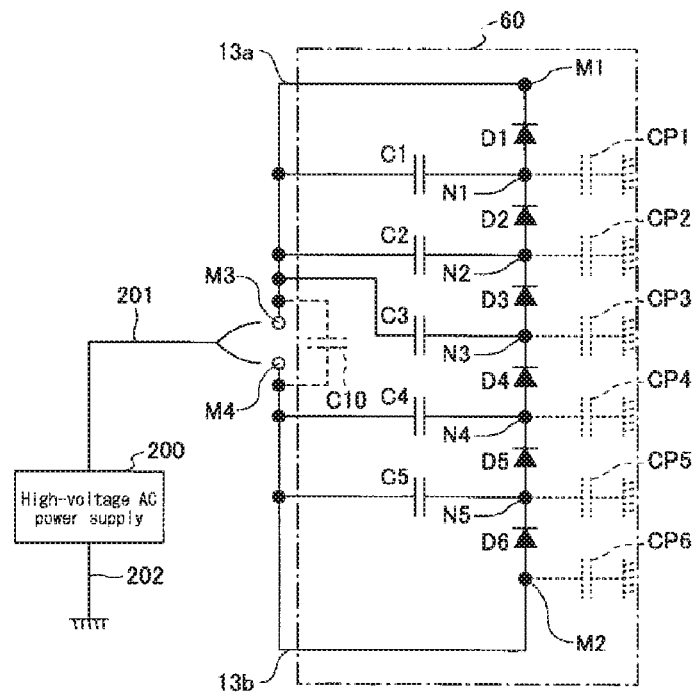
FIG. 4 is a diagram showing the configuration of a light source board 60 which is a first embodiment of a light-emitting apparatus according to the invention and a method for conducting a withstand voltage test.

Hereinafter, embodiments for carrying out the invention will be described with reference to the drawings. FIG. 4 is a diagram showing the configuration of a light source board 60 which is a first embodiment of a light-emitting apparatus according to the invention and a method for conducting a withstand voltage test. As in FIGS. 1 and 2, the light source board 60 is formed of an LED string in which a plurality of light-emitting diodes D (D1-D6) are connected in series, the LED string mounted on a radiation substrate 20. The light source board 60 is a component provided in an LED lighting apparatus illustrated in FIG. 1, and is attached to a housing 30 as is the case with the light source board 10 shown in FIG. 2. Explanations of such components as are found also in FIGS. 1 and 2 will be omitted.

Power supply lines 13 (13a, 13b) are formed of a pattern part and a wire part, which pattern part is formed in a conductive layer 12 of the radiation substrate 20 as is the case with a copper connection 12a and the like, and which wire part is electrically connected to the pattern to facilitate connection with a power supply unit 40 or a high-voltage AC power supply 200.

The light source board 60 has protection capacitors C (C1-C5) mounted thereon, as a protection circuit protecting the LED string from the above-mentioned reverse voltage. The protection capacitors C are mounted on the radiation substrate 20 shown in FIG. 1 on the same mounting surface on which the light-emitting diodes D are mounted. To prevent an excessively high reverse voltage from being applied to the light-emitting diodes in a withstand voltage test, it is necessary to prevent a voltage difference between the anode and the cathode of each light-emitting diode D from being created when a high-voltage alternating-current voltage is applied between the power supply lines 13 (13a, 13b) and a case ground.

Therefore, the protection capacitor C is inserted between a connection N between at least one set of light-emitting diodes and the power supply line 13. More preferably, the protection capacitors C (C1, C5) are each inserted between a corresponding one of the connections N (N1, N5) adjacent to the light-emitting diodes D (D1, D6) that are located at the ends of the LED string and the power supply line 13. Most preferably, the protection capacitors C (C1-05) are each inserted between a corresponding one of all the connections N (N1-N5) between the light-emitting diodes and the power supply line 13 to keep the voltages between the connections N (N1-N5) between the light-emitting diodes and the power supply line 13 at the same potential in order to prevent a voltage difference between the anode and the cathode of each light-emitting diode D from being created. In addition, to make the voltages between the connections N (N1-N5) between the light-emitting diodes and the power supply line 13 as close to zero as possible even in a state in which a high-voltage alternating-current voltage is applied between the power supply line 13 and the case ground, the impedance of each protection capacitor C is set at a value which is much smaller than the impedance of each parasitic capacitance CP (for example, a value of 1/1000 or less, more preferably 1/10000 or less, of the impedance of each parasitic capacitance CP, although the magnitude of the parasitic capacitance CP can vary depending on the type of an object).

Figure 5:
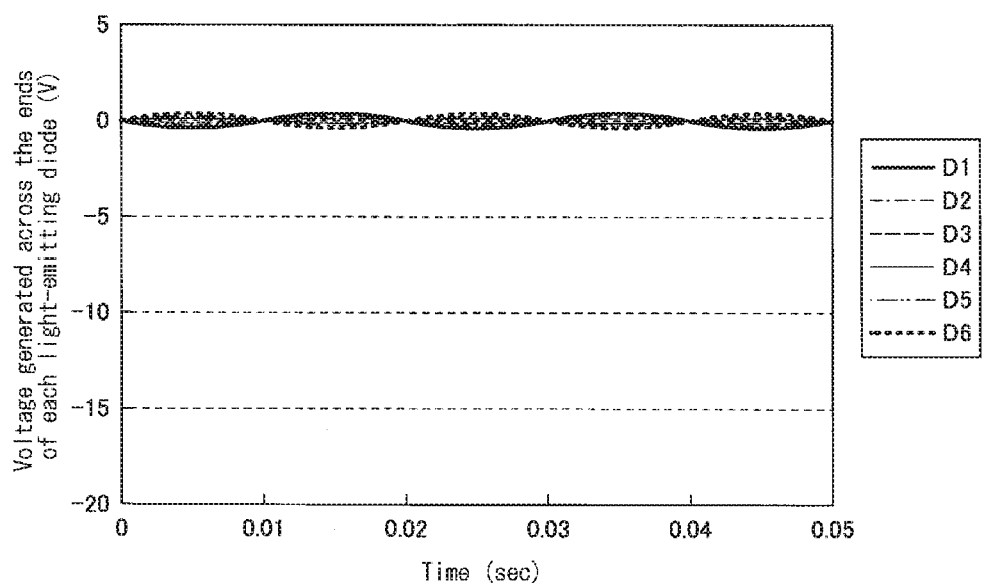
FIG. 5 is a diagram showing the results of simulation of voltages between the terminals (voltages between the electrodes) which are generated across the ends of each light-emitting diode, when an alternating-current voltage of 1000 V/50 Hz is applied between the power supply lines 13 (13a, 13b) and the case ground in the light source board 60.

FIG. 5 shows the results of simulation of voltages between the terminals (voltages between the electrodes) which are generated across the ends of each light-emitting diode, when an alternating-current voltage of 1000 V/50 Hz is applied between the power supply lines 13 (13a, 13b) and the case ground in the light source board 60. The used numerical conditions of the impedance of the elements are the values shown in FIG. 6B (the details thereof will be described later). As shown in FIG. 5, by arranging the protection capacitors C as shown in FIG. 4, it is possible to prevent an excessively high reverse voltage from being applied to the light-emitting diodes D and reduce the current flowing through the light-emitting diodes D even when a withstand voltage test is conducted. As a result, it is possible to reduce the stress which is applied to the light-emitting diodes D by the withstand voltage test.

Figure 6A:
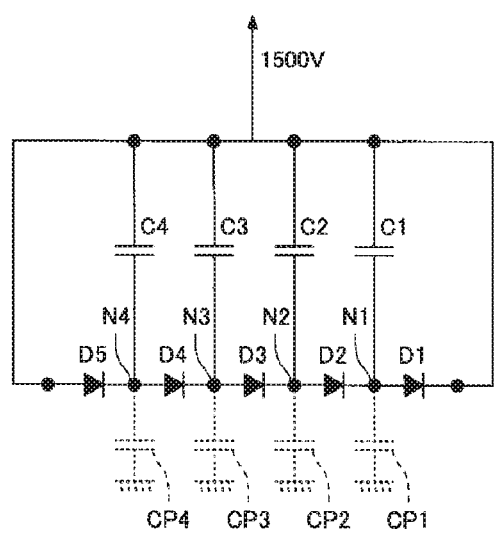
FIG. 6A shows an arrangement model of a circuit of a light source board in a withstand voltage test.
Figure 6B:
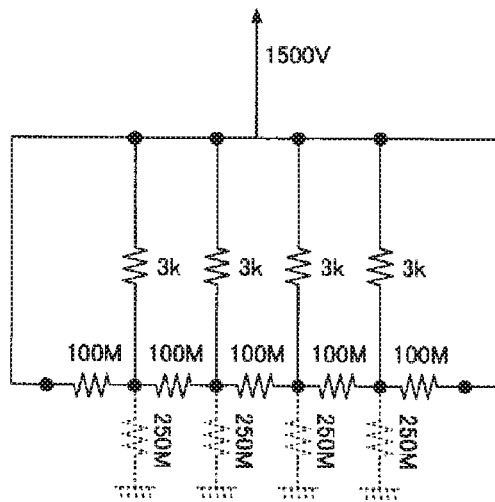
FIG. 6B shows an impedance model of the circuit of the light source board in a withstand voltage test.

FIGS. 6A and 6B show model examples of the light source board to which a high-voltage alternating-current voltage is applied in the withstand voltage test. FIG. 6A shows an arrangement model of a circuit, and FIG. 6B is an impedance model of the circuit of FIG. 6A. In the withstand voltage test, 600-1500 V at 50-60 Hz is applied between the case ground and the power supply lines. The impedance of the light-emitting diode D is about 100 MΩ in a state in which no current flows. The impedance of the parasitic capacitance CP becomes about 250 MΩ in the 50- to 60-Hz range. The electrical capacitance of each parasitic capacitance CP varies with the thickness of an insulating layer (the distance between each copper connection and the metal plate 14) and the pattern area of each copper connection. That is, the electrical capacitance C of the parasitic capacitance CP can be expressed as $$C = \epsilon \times (S/d) \qquad (1),$$

wherein the permittivity is $\epsilon$, the area of the wiring pattern is S, and the thickness of the insulating layer is d. The parasitic capacitance CP is usually of the order of 10-100 pF. The impedance of the protection capacitor is chosen so that an excessively high reverse voltage is not applied to the light-emitting diodes. For that purpose, the impedance of the protection capacitor C simply has to be sufficiently smaller than the impedance of the parasitic capacitance CP at the frequency of the applied alternating-current voltage. That is, the electrical capacitance of the protection capacitor simply has to be sufficiently greater than the electrical capacitance of the parasitic capacitance CP (for example, it is preferable that the electrical capacitance of the former be more than 1000 times that of the latter). For example, in FIG. 6A, the protection capacitor having an electrical capacitance of 1.0 μF is used so that the impedance at 50-60 Hz becomes about 3 kΩ.

In addition, by electrically connecting the electrodes of the light-emitting diodes at the ends of the LED string to the power supply line on the anode side or the power supply line on the cathode side, it is possible to prevent a voltage from being generated in the voltage between the electrodes of each light-emitting diode. It is additionally mentioned that, although the electrical capacitance of the protection capacitor is determined according to the electrical capacitance of the parasitic capacitance CP, it is preferable that the electrical capacitance of the protection capacitor be within a range from 0.01 μf to 10 μf inclusive, for example.

Moreover, by inserting the protection capacitor C between the power supply line 13 and each copper connection N, a voltage is prevented from being generated between the anode and the cathode of each light-emitting diode. As a result, since there is no need to adjust the electrical capacitance of the protection capacitor C irrespective of the number of light-emitting diodes in the LED string even when the number of elements connected in series in the LED string is increased or reduced, it is possible to prevent an increase in the size of the protection capacitor C and an increase in cost.

While the preferred embodiment according to the invention has been described in detail, the invention is not limited to the embodiment described above, and various modifications and replacement can be made in the embodiment described above without departing from the scope of the invention.

Figure 7:
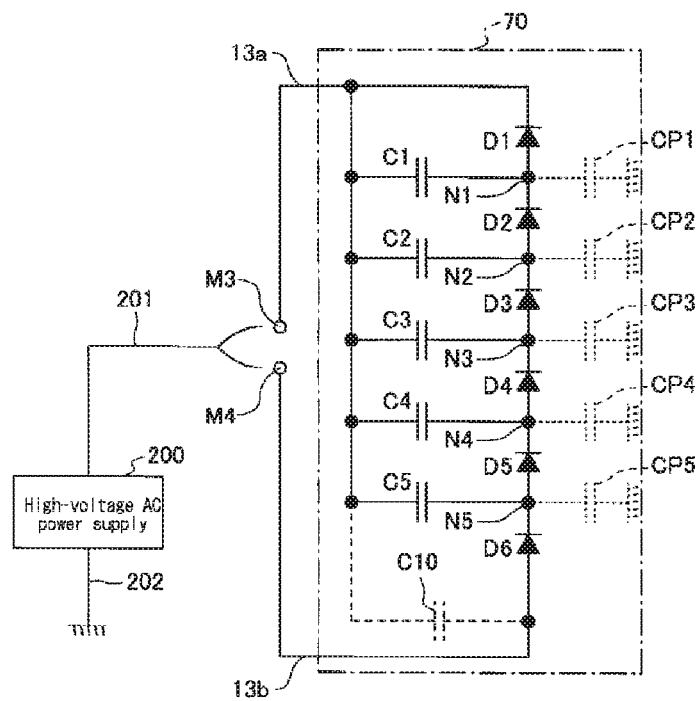
FIG. 7 is a diagram showing the configuration of a light source board 70 which is a second embodiment of the light-emitting apparatus according to the invention and a method for conducting a withstand voltage test.
Figure 8:
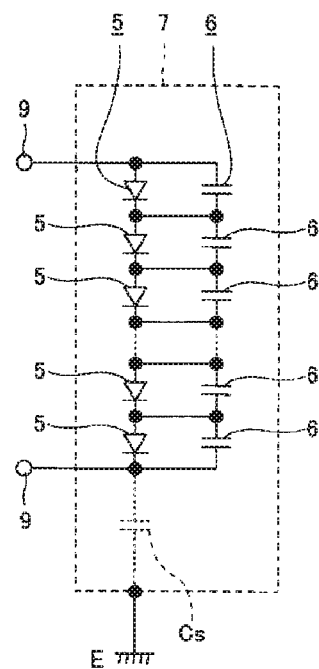
FIG. 8 is a configuration diagram of an LED circuit 7 disclosed in Patent Document 2.

For example, FIG. 7 is a diagram showing the configuration of a light source board 70 which is a second embodiment of the light-emitting apparatus according to the invention and a method for conducting a withstand voltage test. While the light source board 60 of FIG. 4 has the protection capacitors C1-C3 connected to the cathode-side power supply line 13a and the protection capacitors C4 and C5 connected to the anode-side power supply line 13b, the light source board 70 of FIG. 7 has the protection capacitors C1-C5 connected only to the cathode-side power supply line 13a. Alternatively, the protection capacitors C1-c5 may be connected only to the anode-side power supply line 13b.

It is additionally mentioned that, in FIG. 4, an overcurrent may flow through a path "M3—the protection capacitor C3—the copper connection N3—the light-emitting diode D4—the protection capacitor C4-M4", if a high surge voltage is generated between the ends M3 and M4 during normal use as a LED lighting appliance in which the positive electrode side of the power supply unit 40 is connected to an end M4 of the power supply line 13b and the negative electrode side of the power supply unit 40 is connected to an end M3 of the power supply line 13a. Also in FIG. 7, if a high surge voltage is generated between the ends M3 and M4, an overcurrent may flow through a path "M3—the protection capacitor C5—the copper connection N5-the light-emitting diode D6-M4". The reason why an overcurrent flows through these paths is that the impedance of these paths is lower than the impedance of the other paths. Therefore, in order to prevent an overcurrent from flowing through the light-emitting diode D4 of FIG. 4 or the light-emitting diode D6 of FIG. 7, it is preferable to provide a protection capacitor C10.

Moreover, in the embodiments described above, the protection capacitor C has been taken up as a specific example of an element protecting the light-emitting diode from an excessively high reverse voltage. However, a protection element such as a resistance element and a Zener diode may be used.

Furthermore, although it is preferable that a protection element such as the protection capacitor C be mounted on a substrate such as the radiation substrate 20 from the standpoint of ease of arrangement of components and protecting the components from an overvoltage, the protection element may be inserted between the connection N between the light-emitting diodes and the power supply line 13 by being connected by a wire, for example, in the form in which the protection element is not mounted on the substrate.

In addition, in the embodiments described above, the light-emitting diode D is illustrated as a single light-emitting device; however, it is not limited thereto. Design changes may be appropriately made by using a circuit or a package formed of a plurality of light-emitting devices connected in series and/or parallel, for example.

Moreover, regarding the light-emitting diode D, a so-called white visible light-emitting diode, for example, can be used; however, the light-emitting diode D is not limited thereto. The light-emitting diode D may be a blue, red, or green visible light-emitting diode or, for example, a light-emitting diode which can be combined with light conversion fluorescent material or the like and emits light other than visible light, the light such as ultraviolet light or infrared light. Furthermore, a combination of different light-emitting diodes may be used as the light-emitting diode D.

In addition, the substrate on which the light-emitting diode D is mounted may not be the radiation substrate 20, and may be, for example, a printed board such as an FR4 glass epoxy board or a dielectric substrate such as a flexible substrate.

Moreover, the protection element such as the protection capacitor C functions effectively not only for an excessively high voltage which may be generated between the power supply line 13 and the case ground in a withstand voltage test or an overvoltage test, but also for noise such as a surge which may be generated between the power supply line 13 and the case ground in a normal usage state as an LED lighting apparatus.

Figure 2:
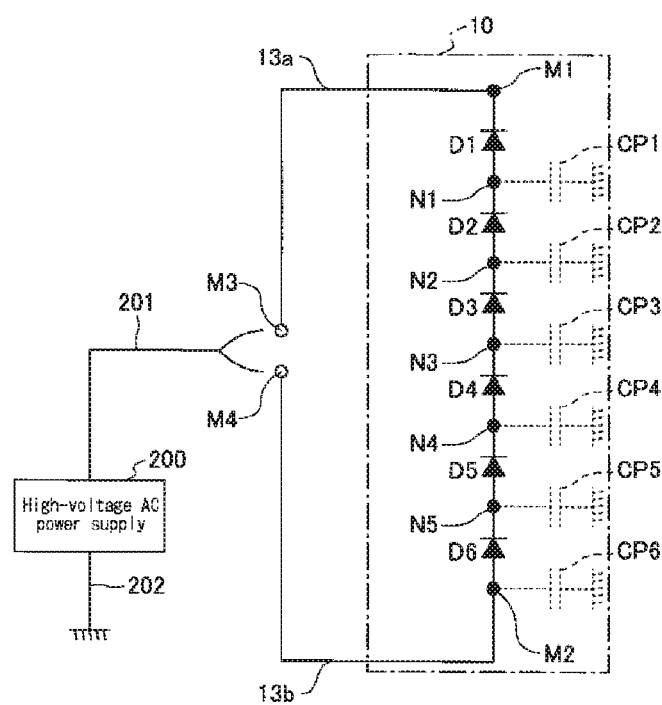
FIG. 2 is a diagram showing the configuration of the light source board 10 and a method for conducting a withstand voltage test.
Figure 3:
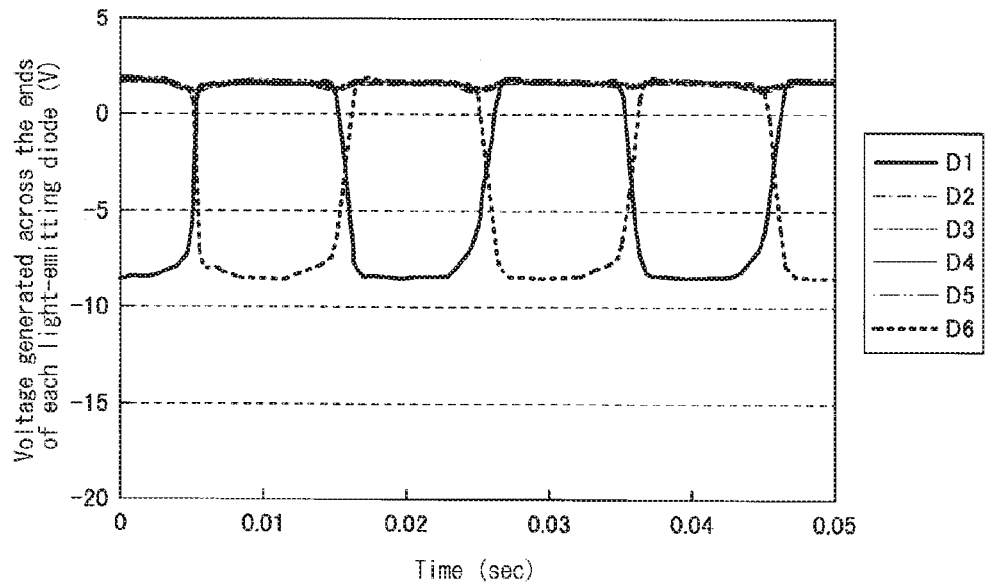
FIG. 3 shows the results of simulation of a voltage between the terminals (a voltage between the electrodes), the voltage generated across the ends of each light-emitting diode, when an alternating-current voltage of 1000 V/50 Hz is applied between power supply lines 13 (13a, 13b) and a case ground in the light source board 10.

Furthermore, the power supply unit 40 shown in FIG. 1 simply has to be provided with an AC-DC converter which converts an alternating-current voltage input from the outside into a direct-current voltage to be applied to the LED string; however, when the voltage input from the outside is a direct-current voltage, the power supply unit 40 may be provided with a DC-DC converter or a switching regulator. In addition, a configuration may be adopted in which the power supply unit 40 is not incorporated into an LED lighting apparatus and an externally generated direct-current voltage is input to the LED lighting apparatus and is then applied to the LED string.

Moreover, the application of the light-emitting apparatus and the lighting appliance according to the invention is not limited to a building such as a house, and thus the light-emitting apparatus and the lighting appliance according to the invention can be applied to uses such as a transportation system such as road lighting, a street light and a traffic light, an automobile, a signboard, or landscape lighting such as a projector.

The invention claimed is:

1. A light-emitting apparatus, comprising:
a substrate;
an LED string mounted on the substrate, in which LED string a plurality of LEDs are connected in series;
a power supply path connected in series to the LED string; and
a plurality of protection elements, each protection element having a first node commonly connected to the power supply path and a second node connected between a pair of the LEDs in the series,
wherein the protection elements include capacitors or zener diodes, and an AC impedance of each protection element is smaller than an impedance between the pair of LEDs and a case ground.

2. The light-emitting apparatus of claim 1, wherein each pair of LEDs is different from each other pair of LEDs.

3. The light-emitting apparatus of claim 1, wherein each of the plurality of protection elements is arranged between each of the pairs of LEDs in the LED string and the power supply node.

4. The light-emitting apparatus of claim 1, wherein the protection elements include capacitors.

5. The light-emitting apparatus of claim 1, wherein the protection elements include zener diodes.

6. The light-emitting apparatus of claim 1, wherein each of the LEDs includes a plurality of light emitting elements.

7. The light-emitting apparatus of claim 1, including a housing to which the substrate is attached.

8. The light-emitting apparatus of claim 1, wherein the power supply path includes a first power supply node on an anode side of the LED string and a second power supply node on a cathode side of the LED string.

9. The light-emitting apparatus of claim 8, wherein:
the plurality of protection elements includes a first set of protection elements and a second set of protection elements;
the first nodes of the protection elements in the first set are commonly connected to the first power supply node; and
the first nodes of the protection elements in the second set are commonly connected to the second power supply node.

10. The light-emitting apparatus of claim 8, including another protection element arranged between the first and second power supply nodes.

* * * * *